US012782668B2

(12) United States Patent
Lee

(10) Patent No.: US 12,782,668 B2
(45) Date of Patent: Nov. 3, 2026

(54) CAMERA MODULE

(71) Applicant: Samsung Electro-Mechanics Co., Ltd., Suwon-si (KR)

(72) Inventor: Jae Chan Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 752 days.

(21) Appl. No.: 17/210,883

(22) Filed: Mar. 24, 2021

(65) Prior Publication Data

US 2022/0066121 A1 Mar. 3, 2022

(30) Foreign Application Priority Data

Sep. 1, 2020 (KR) ........................ 10-2020-0110711

(51) Int. Cl.

*G02B 7/02* (2021.01)
*G03B 17/12* (2021.01)
*G03B 17/55* (2021.01)
*H04N 23/55* (2023.01)

(52) U.S. Cl.

CPC ............. *G02B 7/028* (2013.01); *G02B 7/021* (2013.01); *G03B 17/12* (2013.01); *G03B 17/55* (2013.01); *H04N 23/55* (2023.01)

(58) Field of Classification Search

CPC .... G02B 7/028; G02B 7/021; G02B 27/0006; G03B 17/12; G03B 17/55; G03B 30/00; G03B 17/02; H04N 23/54; H04N 23/55; H04N 23/52; H04N 23/57

See application file for complete search history.

(56) References Cited

U.S. PATENT DOCUMENTS

| | | | | |
|---|---|---|---|---|
| 6,353,203 | B1 * | 3/2002 | Hokodate | B23K 26/032 219/121.75 |
| 10,580,811 | B2 | 3/2020 | Fukuda | |
| 2002/0162338 | A1 * | 11/2002 | Shimada | H01L 23/38 257/E23.114 |
| 2004/0114920 | A1 * | 6/2004 | Rife | G02B 7/028 348/E5.09 |
| 2007/0076304 | A1 * | 4/2007 | Chen | G02B 7/028 359/721 |
| 2008/0276624 | A1 * | 11/2008 | Morimoto | H10N 10/10 62/3.7 |

(Continued)

FOREIGN PATENT DOCUMENTS

| | | | |
|---|---|---|---|
| CN | 101094316 A | * | 12/2007 |
| CN | 108027548 A | | 5/2018 |

(Continued)

OTHER PUBLICATIONS

Korean Office Action issued on Mar. 29, 2022, in counterpart Korean Patent Application No. 10-2020-0110711 (9 pages in English and 6 pages in Korean).

(Continued)

*Primary Examiner* — Sharrief I Broome
*Assistant Examiner* — K Muhammad
(74) *Attorney, Agent, or Firm* — NSIP Law

(57) ABSTRACT

A camera module includes a substrate including an image sensor and an electrode, a thermoelectric element disposed on the substrate and having a surface contact the electrode, and a first lens disposed on another surface of the thermoelectric element.

19 Claims, 7 Drawing Sheets

(56) References Cited

U.S. PATENT DOCUMENTS

| | | | | |
|---|---|---|---|---|
| 2008/0295878 | A1* | 12/2008 | Dai | H10N 10/13 136/201 |
| 2008/0316344 | A1* | 12/2008 | Yamamiya | H04N 23/687 348/340 |
| 2009/0194668 | A1* | 8/2009 | Kong | G02B 7/08 250/201.2 |
| 2009/0296240 | A1* | 12/2009 | Franz | H04N 23/54 359/820 |
| 2011/0261242 | A1* | 10/2011 | Izutani | H10F 39/804 348/308 |
| 2012/0243093 | A1 | 9/2012 | Tonar et al. | |
| 2014/0061438 | A1* | 3/2014 | Rohde | H04N 23/55 250/208.1 |
| 2015/0008418 | A1* | 1/2015 | Yahagi | H10K 10/88 257/40 |
| 2015/0146094 | A1* | 5/2015 | Seger | H04N 23/51 348/374 |
| 2015/0185592 | A1* | 7/2015 | Eineren | G03B 17/08 348/375 |
| 2017/0242213 | A1 | 8/2017 | Kuroda | |
| 2018/0188636 | A1* | 7/2018 | Kim | G02B 7/028 |
| 2019/0041630 | A1 | 2/2019 | Park | |
| 2019/0067350 | A1 | 2/2019 | Fukuda | |
| 2019/0154945 | A1* | 5/2019 | Wang | G02B 7/003 |
| 2019/0165235 | A1 | 5/2019 | Kwak et al. | |
| 2019/0353987 | A1 | 11/2019 | Choi et al. | |
| 2020/0033549 | A1* | 1/2020 | Liu | G03B 13/32 |

FOREIGN PATENT DOCUMENTS

| | | | | | |
|---|---|---|---|---|---|
| CN | 207337051 | U | | 5/2018 | |
| CN | 108391451 | A | | 8/2018 | |
| CN | 109841725 | A | | 6/2019 | |
| CN | 110326282 | A | | 10/2019 | |
| DE | 10 2015 116 962 | A | | 4/2017 | |
| JP | 2010-008622 | A | | 1/2010 | |
| KR | 100950386 | B1 | * | 3/2010 | |
| KR | 10-2014-0069803 | A | | 6/2014 | |
| KR | 20140076408 | A | * | 6/2014 | |
| KR | 10-1446397 | B1 | | 10/2014 | |
| KR | 10-2016-0081697 | A | | 7/2016 | |
| KR | 10-2017-0004053 | A | | 1/2017 | |
| KR | 10-2017-0032585 | A | | 3/2017 | |
| KR | 10-2018-0129204 | A | | 12/2018 | |
| TW | 200840333 | A | * | 10/2008 | |
| WO | WO-2012144819 | A2 | * | 10/2012 | H01L 25/167 |
| WO | WO 2016/084599 | A1 | | 6/2016 | |
| WO | WO 2017/090223 | A1 | | 6/2017 | |

OTHER PUBLICATIONS

Korean Notice of Reason for Rejection issued on Sep. 20, 2021 corresponding Korean Patent Application No. 10-2020-0110711 (8 pages in English and 6 pages in Korean).

Chinese Office Action Issued on Mar. 15, 2024, in Counterpart Chinese Patent Application No. 202110788078.4 (5 Pages in English, 11 Pages in Chinese).

Chinese Office Action issued on Jul. 25, 2024 in corresponding Chinese Patent Application No. 202110788078.4. (4 pages in English and 5 pages in Chinese).

* cited by examiner

CAMERA MODULE

CROSS-REFERENCE TO RELATED APPLICATION(S)

This application claims the benefit under 35 USC 119(a) of Korean Patent Application No. 10-2020-0110711 filed on Sep. 1, 2020 in the Korean Intellectual Property Office, the entire disclosure of which is incorporated herein by reference for all purposes.

BACKGROUND

1. Field

The present disclosure relates to a camera module.

2. Description of Related Art

With the development of ADAS technology, there has been a demand for accurately sensing and determining various situations that may occur during actual driving, such as techniques for distance recognition and object classification as a camera, a LiDAR, and a radar. For example, a vehicle may obtain an image of vehicle surroundings through a camera and process the image with software to obtain information on a physical situation around the vehicle.

However, when condensation or frost is formed on a camera lens surface, it may be difficult to accurately recognize surrounding objects using a camera. Generally, a method in which heat may be transferred by winding a heating wire around a camera has been used, an electrical wire may be put on a flexible film to wrap around the lens barrel, or an additional cover glass may be added to a lens, and a transparent electrode such as ITO (indium-tin oxide) or a flexible heat transfer substrate may be applied thereto. However, there still has been performance degradation (distortion, reduced viewing angle, etc.) of a camera due to sudden changes in temperature or an added cover glass, and a module structure may become complicated, and manufacturing costs may increase.

Also, in addition to condensation or frost formed on the lens, the heat generated from the image sensor may cause deterioration of camera performance. The heat generated by the image sensor may damage the image sensor itself or may deform the lens barrel. When the lens barrel is deformed, an arrangement of lenses disposed therein may change, leading to a deterioration of image quality.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a substrate including an image sensor and an electrode, a thermoelectric element disposed on the substrate and having a surface contact the electrode, and a first lens disposed on another surface of the thermoelectric element.

The thermoelectric element may be configured to cool the image sensor and heat the first lens when a voltage of a first polarity is applied to the thermoelectric element through the electrode.

The thermoelectric element may be configured to cool the first lens when a voltage of a second polarity, different from the first polarity, is applied to the thermoelectric element through the electrode.

The camera module may further include a second lens. The thermoelectric element may include a penetrating portion configured to accommodate the second lens.

The second lens may include a plurality of second lenses.

The substrate may include a heat transfer member disposed below the image sensor.

The thermoelectric element may include a plurality of unit thermoelectric elements stacked in an optical axis direction.

The camera module may further include at least one second lens. The thermoelectric element may include a penetrating portion configured to accommodate the at least one second lens.

Each of the unit thermoelectric elements may include a penetrating portion, and the at least one second lens may be accommodated in at least one of the penetrating portions of the plurality of unit thermoelectric elements.

At least one stepped portion may be formed between the plurality of unit thermoelectric elements, and the at least one second lens may be partially supported by the stepped portion.

The electrode may have a positive electrode and a negative electrode, and the positive electrode and the negative electrode may be electrically connected to corresponding terminals provided in the thermoelectric element.

The positive electrode and the negative electrode may have an arc shape centered on the image sensor.

The thermoelectric element may have a cylindrical shape configured to accommodate the image sensor. One end of the thermoelectric element in a length direction may be in contact with the electrode, and another end of the thermoelectric element in the length direction may be in contact with the lens.

The thermoelectric element may include at least one P-type semiconductor and at least one N-type semiconductor alternately circumferentially disposed.

In another general aspect, a camera module includes a substrate including an electrode and an image sensor, a thermoelectric element having an end contact the substrate and electrically connected to the electrode, and a lens in contact with another end of the thermoelectric element. The end or the another end of the thermoelectric element is configured to absorb or release heat based on a voltage applied through an electrode.

The thermoelectric element may be electrically connected to the substrate, and the thermoelectric element may be further configured to cool the image sensor and to heat the lens when a voltage of a first polarity is applied to the thermoelectric element.

The thermoelectric element may be further configured to cool the lens when a voltage of a second polarity, different from the first polarity, is applied to the thermoelectric element.

The camera module may include a second lens being accommodated in the thermoelectric element.

The second lens may include a plurality of second lenses.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
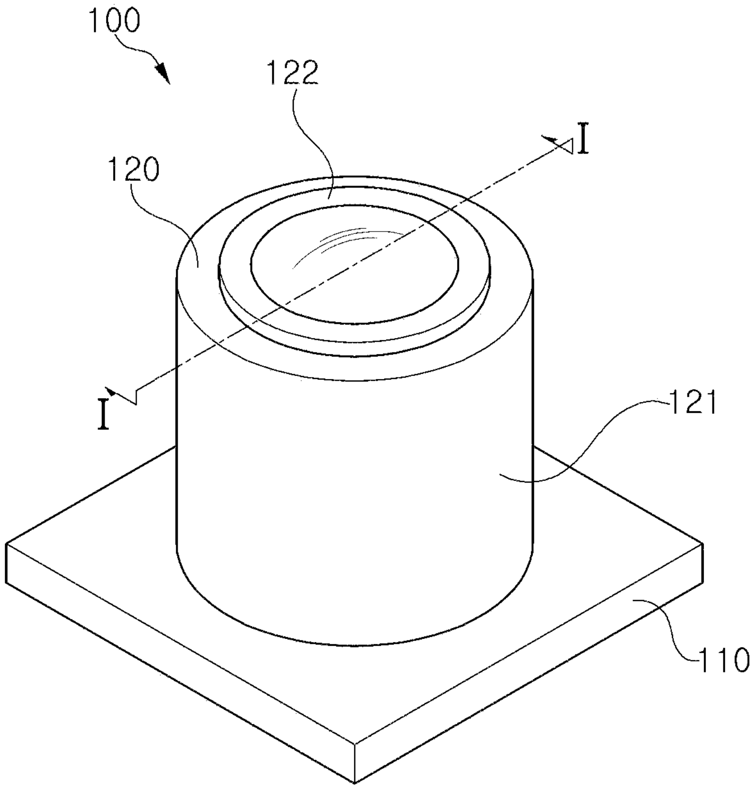
FIG. 1 is a perspective diagram illustrating an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

An aspect of the present disclosure is to provide a means for removing condensation or frost formed on a camera lens depending on a surrounding environment, and to prevent an image sensor from being damaged or a lens barrel from being deformed due to heat generated by a sensor surface.

Figure 2:
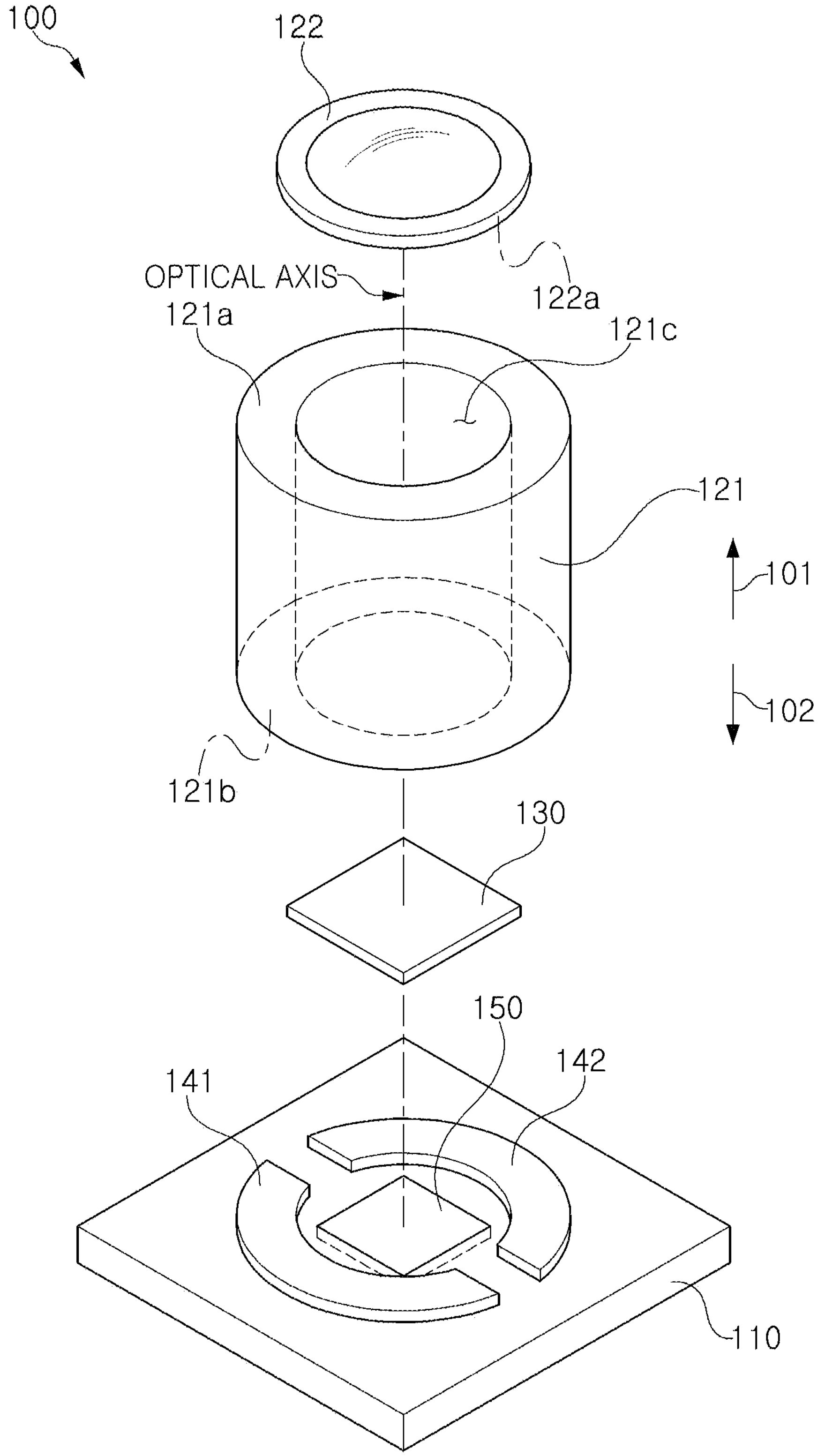
FIG. 2 is an exploded perspective diagram illustrating the camera module illustrated in FIG. 1.
Figure 3:
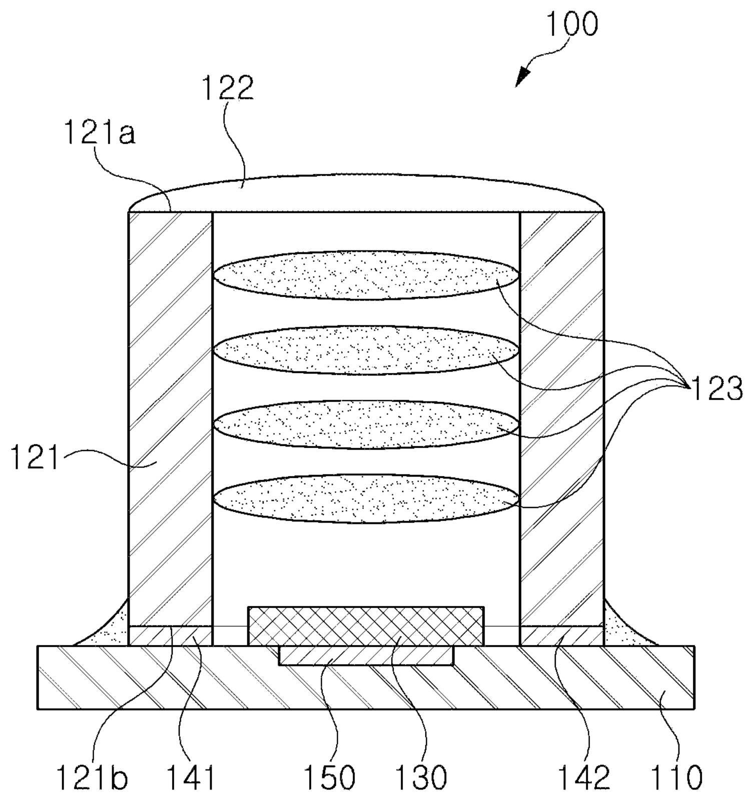
FIG. 3 is a cross-sectional diagram illustrating an example of a camera module.

FIG. 1 is a perspective diagram illustrating an example of a camera module 100. FIG. 2 is an exploded perspective diagram illustrating the camera module 100 illustrated in FIG. 1. FIG. 3 is a cross-sectional diagram illustrating an example of a camera module 100.

In FIGS. 1 to 3, in an example, the camera module 100 may include a substrate 110 and a lens assembly 120 assembled to the substrate 110.

In an example, the lens assembly 120 may include a thermoelectric element 121 and at least one lens 122 and 123 coupled to the thermoelectric element 121. In an example, the thermoelectric element 121 may be configured to align at least one lenses 122 and 123 with the image sensor 130. When the thermoelectric element 121 is assembled to the substrate 110, at least one lens 122 and 123 coupled to the thermoelectric element 121 may be aligned with the image sensor 130.

In an example, the thermoelectric element 121 may extend from a bottom surface 121*b* (or a first surface)

opposing the substrate 110 towards an upper-end surface 121*a* (or a second surface) in an optical axis direction. The upper-end surface 121*a* may be defined as a surface of the thermoelectric elements 121 directed in the first direction 101 parallel to the optical axis, and the bottom surface 121*b* may be defined as a surface of the thermoelectric elements 121 directed in a second direction 102 opposite to the first direction 101.

In an example, a forwardmost lens 122 may be disposed on the upper-end surface 121*a* of the thermoelectric element 121. The forwardmost lens 122 may be defined as a lens disposed most adjacent to a subject or a lens disposed farthest of a substrate among the lenses provided in the lens assembly 120. In an example, a portion of the lower surface 122*a* of the forwardmost lens 122 may be in contact with the upper-end surface 121*a* of the thermoelectric element 121.

In an example, the thermoelectric element 121 may include a penetrating portion 121*c* configured to accommodate at least one lens 123. In an example, the through portion 121*c* of the thermoelectric element 121 may be configured to align at least one lens 123 provided therein when the thermoelectric element 121 is coupled to the substrate 110. For example, the thermoelectric element 121 may have a hollow cylindrical shape, and at least one lens may be disposed in the internal space 121*c* of the cylindrical shape. In the illustrated example, only the forwardmost lens 122 disposed on the upper-end surface 121*a* of the thermoelectric element 121 is illustrated, but another lens (e.g., at least one lens 123 in FIG. 3) may be disposed in the thermoelectric element 121.

The element referred to as a lens in the example may be implemented by a material that may pass light, and the lens does not necessarily have a curved surface. For example, the description of the forwardmost lens 122 in the example may also be applied to a cover glass having a planar surface.

In an example, the image sensor 130 may be mounted on the substrate 110. The image sensor 130 may generate a signal including image information in response to light passing through the lens assembly 120.

In an example, the substrate 110 may include an electrode disposed on a surface on which the image sensor 130 is mounted. The electrode may include a positive electrode 141 (or a first electrode) and a negative electrode 142 (or a second electrode).

In an example, each of the first electrode 141 and the second electrode 142 may have an arc shape centering on the image sensor 130. However, the electrode's shape is not limited to the illustrated example, and the electrode may have various shapes in other examples. For example, the electrode may have a quadrangular shape or a circular shape.

In an example, the lens assembly 120 may be directly disposed on the substrate 110. For example, a bottom surface 121*b* (or a first surface) of the thermoelectric element 121 may contact the substrate 110. As another example, the bottom surface 121*b* of the thermoelectric element 121 may contact the electrodes 141 and 142 disposed on the substrate 110. In an example, the thermoelectric element 121 may be assembled to the substrate 110 through a conductive adhesive member or solder.

In an example, the electrode may be electrically connected to the thermoelectric element 121. In an example, the electrode may be in contact with the bottom surface 121*b* of the thermoelectric element 121. A voltage may be applied to the thermoelectric element 121 through the electrode, and a current may flow in the thermoelectric element 121 according to the applied voltage. When a current flows in the thermoelectric element 121, the upper-end surface 121*a* (or the second surface) and the bottom surface 121*b* (or the first surface) on opposing ends of the thermoelectric element 121 may emit heat or may absorb heat. The operation and characteristics of the thermoelectric element 121 will be described in greater detail with reference to FIG. 4.

In an example, the substrate 110 may include a heat-transferring member 150 disposed under the image sensor 130. The heat transfer member 150 may effectively dissipate heat generated from the image sensor 130 to a surrounding area. However, the heat transfer member 150 may not be provided in the camera module 100 in an example.

Although not illustrated in the drawings, in an example, the camera module 100 may further include a housing configured to protect the lens assembly 120 or the substrate 110 from external impacts.

The camera module 100 may need to maintain a certain level of performance even when the camera module 100 is disposed in various different environments. When the camera module 100 implements a driving assistance function for a driver, reliability for the performance of the camera module 100 may be desirable as the reliability may be directly related to the driver's safety. Generally, when the camera module 100 is exposed to low-temperature air, water vapor contained in the air around the camera lens (e.g., the forwardmost lens 122 in FIG. 1) may condense on the cold camera lens surface. Condensation or frost formed on the surface of the lens may degrade image quality. The water vapor condensed on the surface of the lens may be removed by heating the lens.

When the image sensor 130 is heated by a high-temperature atmosphere or driving of the image sensor 130, the sensor's performance may deteriorate. By maintaining the temperature of the image sensor 130 at an appropriate level through a device (or structure) for cooling the heat of the image sensor 130, the degradation of performance of the camera may be reduced or prevented.

The lens may be deformed according to a temperature change, leading to a potential deterioration of image quality. Therefore, the temperature of the lens may need to be maintained at an appropriate level. Also, when the camera lens is formed of plastic, the degree of deformation of the lens caused by a temperature change may be relatively larger than that of the glass lens. Performance of the camera module 100 may be maintained to be constant by preventing or reducing deformation of the lens caused by excessive heat.

A portion of the thermoelectric element 121 may emit heat based on current flowing therein, and the other portion of the thermoelectric element 121 may absorb heat. Accordingly, the thermoelectric element 121 may be configured such that the heat-absorbing portion and the heat-dissipating portion may be disposed in, or the vicinity of, an object (e.g., the image sensor 130 and the forwardmost lens 122) to be cooled or heated.

For example, heat may be emitted or absorbed by both ends of the thermoelectric element 121, and one end of the thermoelectric element 121 may be disposed on the substrate 110. The other end of the thermoelectric element 121 may contact a portion of the forwardmost lens 122. For example, the thermoelectric element 121 may be configured such that the upper-end surface 121*a* on which the forwardmost lens 122 is disposed or the bottom surface 121*b* in contact with the substrate 110 may absorb or emit heat.

For example, the thermoelectric element 121 may be configured to emit heat from the upper-end surface 121*a*. It may absorb heat by the bottom surface 121*b* when a current flows in the thermoelectric element 121. In this case, the forwardmost lens 122 disposed on the upper-end surface 121*a* may be heated, and the image sensor 130 adjacent to the bottom surface 121*b* may be cooled. When the temperature of the forwardmost lens 122 disposed on the upper-end surface 121*a* decreases or the temperature of the image sensor 130 increases, the thermoelectric element 121 may heat the forwardmost lens 122 and may cool the image sensor 130.

As another example, the thermoelectric element 121 may be configured to absorb heat by the upper-end surface 121*a* and emit heat from the bottom surface 121*b* when current flows in the thermoelectric element 121. When the temperature of the forwardmost lens 122 disposed on the upper-end surface 121*a* increases, the thermoelectric element 121 may cool the forwardmost lens 122 disposed on the upper-end surface 121*a*.

According to an example, since the thermoelectric element 121 is configured to align the lens with the image sensor 130, the thermoelectric element 121 in the example may work as a lens barrel. That is, the thermoelectric element 121 in the example may work as a lens barrel and may also heat or cool the components (e.g., the forwardmost lens 122 and the image sensor 130) provided in the camera module 100, which may contribute to reducing a size of the camera module 100.

Figure 4:
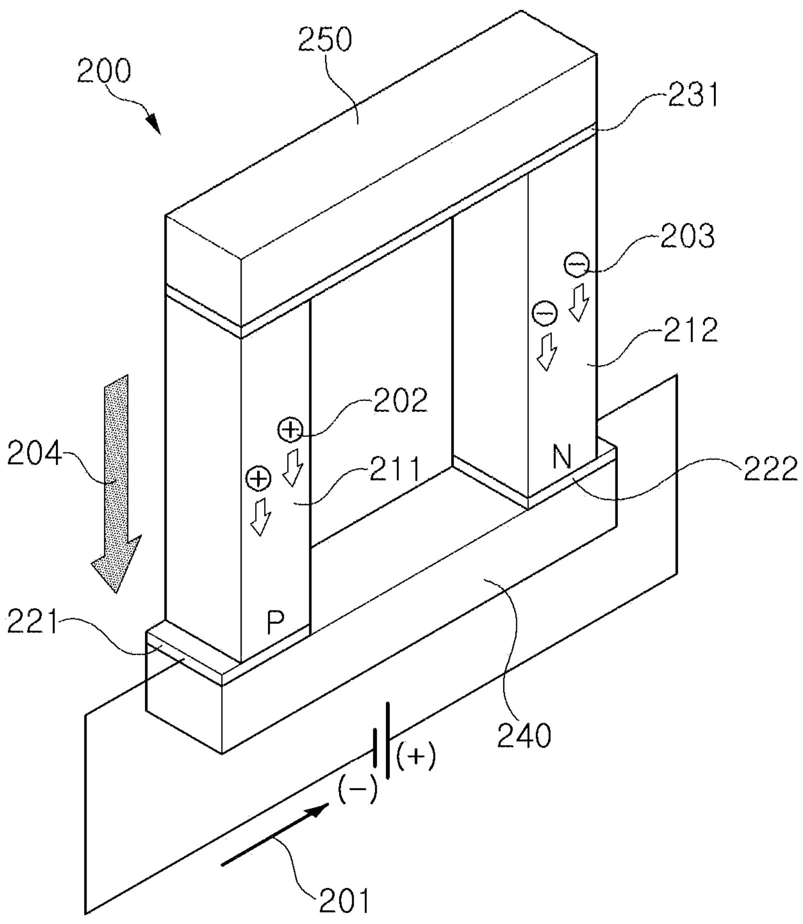
FIG. 4 is a diagram illustrating an example of operations of a thermoelectric element.

FIG. 4 is a diagram illustrating an example of operations of a thermoelectric element.

The thermoelectric element 121 may include a P-type semiconductor 211, an N-type semiconductor 212, and a connecting part 231 for connecting the P-type semiconductor 211 to the N-type semiconductor 212. The connecting part 231 may electrically connect the P-type semiconductor 211 to the N-type semiconductor 212. The thermoelectric element 121 may include a first terminal 221 connected to a lower end of the P-type semiconductor 211 and a second terminal 222 connected to a lower end of the N-type semiconductor 212. In an example, the connecting part 231 and the terminals may include at least one of a doped semiconductor, a metal, and a metal compound.

When the negative electrode and the positive electrode of a DC power supply are connected to the first terminal 221 and the second terminal 222, respectively, a current may flow in the direction of an arrow 201. When the current flows in the direction of the arrow 201, positive holes 202 in the P-type semiconductor 211 may move towards the first terminal 221, and electrons 203 in the N-type semiconductor 212 may move towards the second terminal 222. Heat in the thermoelectric element 121 may move in the direction of the arrow 204 by the Peltier effect. The connecting part 231 may absorb heat, and the first terminal 221 and the second terminal 222 may emit heat. Accordingly, the object 250 in contact with the connecting part 231 may be cooled, and the object 240 in contact with the electrode may be heated.

Differently from the illustrated example, when the positive electrode and the negative electrode of the DC power supply are connected to the first terminal 221 and the second terminal 222, respectively, a current flows in a direction opposite to the direction of the arrow 201. The direction of heat transfer may also be opposite to the direction of the arrow 204, and the connecting part 231 may emit heat, and the first terminal 221 and the second terminal 222 may absorb heat. Accordingly, the object 250 in contact with the connecting part 231 may be heated, and the object 240 in contact with the electrode may be cooled.

Therefore, using the thermoelectric element 121, a partial region may be heated while heating the other region. The heating or cooling degree may be adjusted by adjusting the intensity of the current flowing in the thermoelectric element 121. Also, a specific region may be heated or cooled by adjusting the current flowing direction in the thermoelectric element 121.

Figure 5:
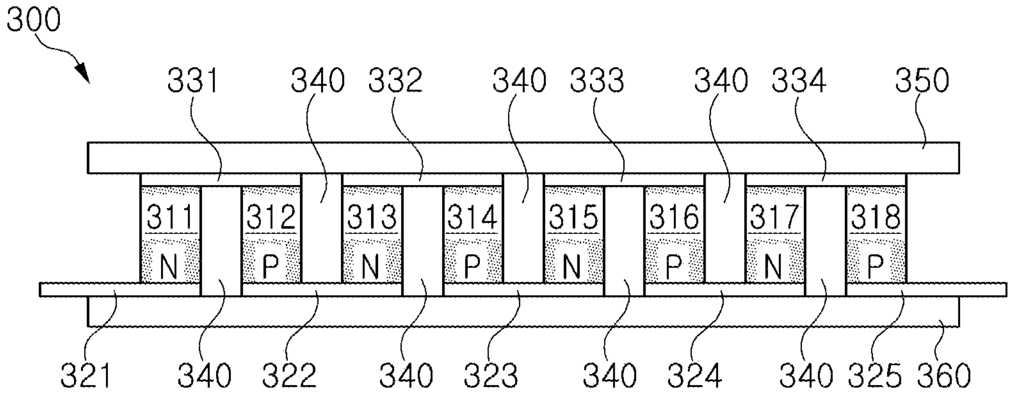
FIG. 5 is a diagram illustrating an example of a thermoelectric element in which semiconductors are connected to each other in series.
Figure 6:
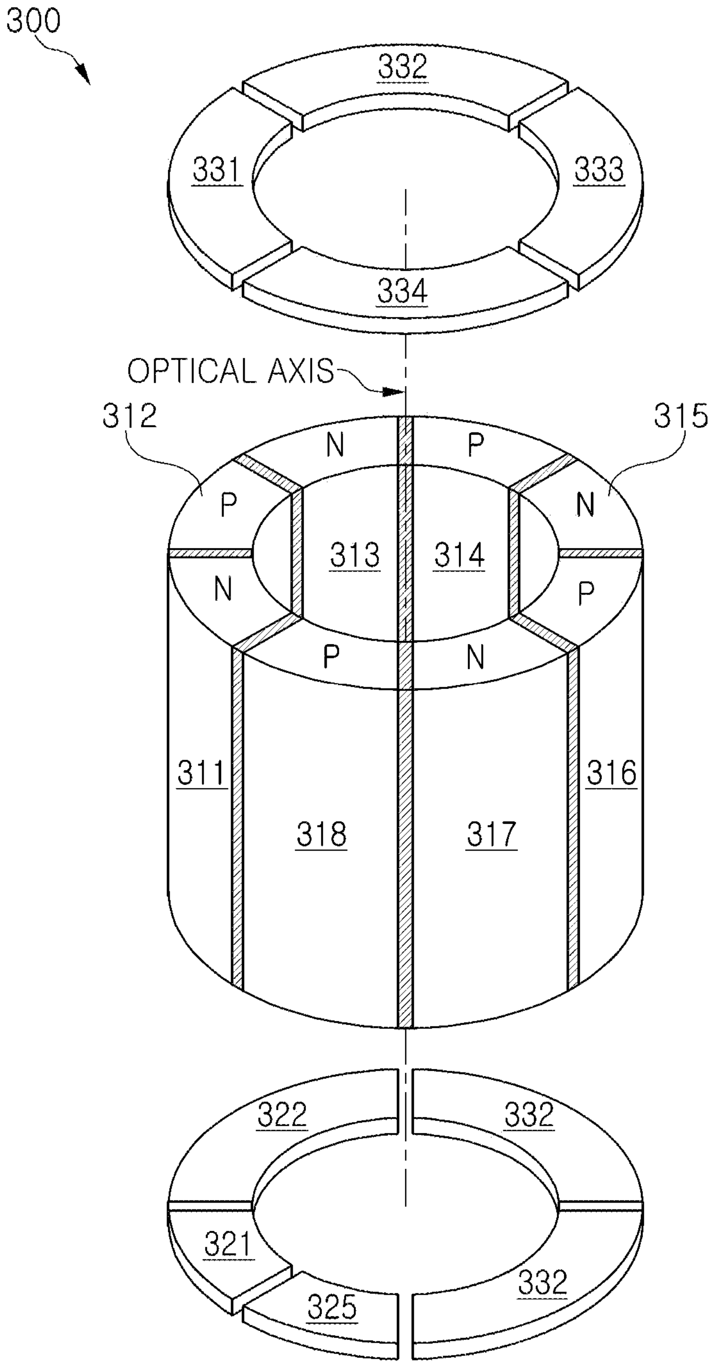
FIG. 6 is a diagram illustrating an example in which the thermoelectric element in FIG. 5 is configured to have a hollow cylindrical shape.
Figure 7:
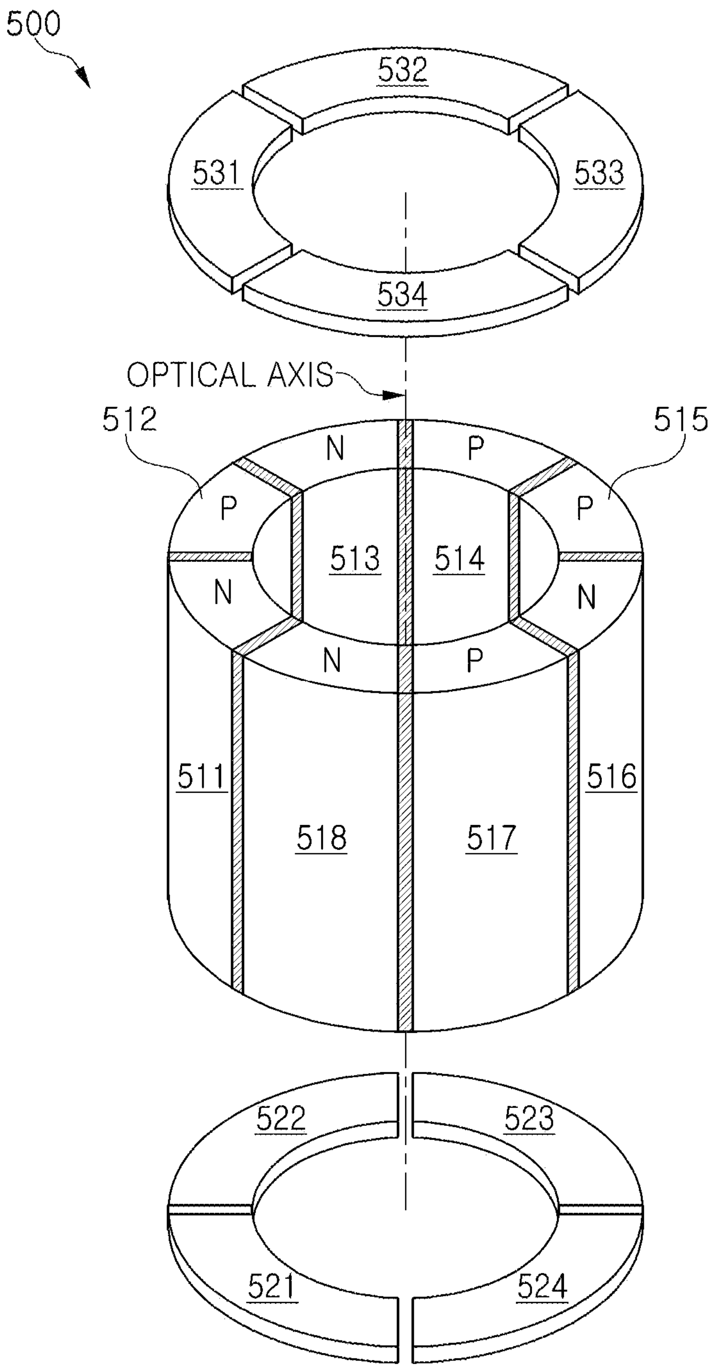
FIG. 7 is a diagram illustrating an example of a thermoelectric element, including a penetrating portion therein.

FIG. 5 is a diagram illustrating an example of a thermoelectric element 300 in which semiconductors are connected to each other in series. FIG. 6 is a diagram illustrating an example in which the thermoelectric element 300 in FIG. 5 is configured to have a hollow cylindrical shape. FIG. 7 is a diagram illustrating an example of a thermoelectric element 500, including a penetrating portion therein.

In FIG. 5, in the thermoelectric element 300, N-type semiconductors and P-type semiconductors may be alternately connected in series.

For example, the lower end of the first N-type semiconductor 311 may be connected to the first terminal 321, and an upper end may be connected to an upper end of the first P-type semiconductor 312 through a first connecting part 331. The lower end of the first P-type semiconductor 312 may be connected to the lower end of the second N-type semiconductor 313 through the second connecting part 322. The upper end of the second N-type semiconductor 313 may be connected to the upper end of the second P-type semiconductor 314 through the third connecting part 332. The lower end of the second P-type semiconductor 314 may be connected to the lower end of the third N-type semiconductor 315 through the fourth connecting part 323. The upper end of the third N-type semiconductor 315 may be connected to the upper end of the third P-type semiconductor 316 through the fifth connecting part 333. The lower end of the third P-type semiconductor 316 may be connected to the lower end of the fourth N-type semiconductor 317 through the sixth connecting part 324. The upper end of the fourth N-type semiconductor 317 may be connected to the upper end of the fourth P-type semiconductor 318 through the seventh connecting part 334. The lower end of the fourth P-type semiconductor 318 may be connected to the second terminal 325.

In an example, an air gap or an insulating member may be disposed between the semiconductors 340. In an example, when a voltage is applied between the first terminal 321 and the second terminal 325, a current may flow in the thermoelectric element 300, and terminals 321 and 325 and the connecting parts 322, 323, and 324 disposed under the semiconductors may emit or absorb heat by the Peltier effect. For example, when the positive electrode and the negative electrode of the DC power supply are connected to the first terminal 321 and the second terminal 325, respectively, the first region 360 connected to the lower portion of the semiconductors may be heated, and the second region 350 connected to the upper portion may be cooled. As another example, when the negative electrode and the positive electrode of the DC power supply are connected to the first terminal 321 and the second terminal 325, respectively, the first region 360 may be cooled, and the second region 350 may be heated.

In an example, the thermoelectric element 300 in FIG. 5 may have a hollow cylindrical shape. In an example, at least one P-type semiconductor and at least one N-type semiconductor may be alternately disposed in at least a partial section in a circumferential direction of the cylinder. In an example, the alternately disposed N-type semiconductors and P-type semiconductors may be connected to each other in series through conductive members (e.g., the first connecting part 331 in FIG. 5).

In FIG. 6, in an example, the thermoelectric element 300 may be configured to include a space therein. The thermoelectric element 300 configured as in FIG. 5 may have a hollow cylindrical shape. It may be understood that the thermoelectric element 300 in FIG. 6 may be another example implemented by bending the thermoelectric element 300 in FIG. 5 around one axis such that the first N-type semiconductor 311 is adjacent to the fourth P-type semiconductor 318.

In FIG. 7, semiconductors in the thermoelectric element may be connected in parallel. The first terminal 521 may be connected to a lower end of the first N-type semiconductor 511 and a lower end of the second N-type semiconductor 518. The upper end of the first N-type semiconductor 511 may be connected to the upper end of the first P-type semiconductor 512 through the first connecting part 531, and the upper end of the second N-type semiconductor 518 may be connected to the upper end of the second P-type semiconductor 517 through the second connecting part 534. The lower end of the first P-type semiconductor 512 may be connected to the lower end of the third N-type semiconductor 513 through the third connecting part 522. The upper end of the third N-type semiconductor 513 may be connected to the upper end of the third P-type semiconductor 514 through the fifth connecting part 532. The lower end of the second P-type semiconductor 517 may be connected to the lower end of the fourth N-type semiconductor 516 through the fourth connecting part 524. The upper end of the fourth N-type semiconductor 516 may be connected to the upper end of the fourth P-type semiconductor 515 through the sixth connecting part 533. The lower end of the third P-type semiconductor 514 and the lower end of the fourth P-type semiconductor 515 may be connected to the second terminal 523.

When a positive electrode is connected to the first terminal 521, a current flowing into the first terminal 521 may be divided and flow into the first N-type semiconductor 511 and the second N-type semiconductor 518, and may be merged in second terminal 523. Electrons in the N-type semiconductors and holes in the P-type semiconductors may move from an upper end to a lower end, and accordingly, heat may also move from the upper end to the lower end. When the negative electrode is connected to the first terminal 521, heat may move from the lower end to the upper end.

When the thermoelectric element 121 in FIG. 2 is implemented as the thermoelectric elements 300 or 500 illustrated in FIG. 6 or 7, the upper-end surface 121*a* and the bottom surface 121*b* of the thermoelectric element 121 may absorb or emit heat. For example, when the thermoelectric element 121 in FIG. 2 is implemented as the thermoelectric element 300 illustrated in FIG. 5, the surface of the thermoelectric element 300 in contact with the first region 360 and the surface in contact with the second region 350 may be configured as the bottom surface 121*b* and the upper-end surface 121*a* illustrated in FIG. 2, respectively. Also, the first region 360 and the second region 350 may correspond to the substrate 110 and the forwardmost lens 122, respectively.

By connecting the first electrode 141 and the second electrode 142 of the substrate 110 illustrated in FIG. 2 to the first terminals 321 and 521 and the second terminals 325 of the thermoelectric elements 300 and 500, respectively, a voltage may be applied to the thermoelectric elements 300 and 500.

In an example, the thermoelectric elements 300 and 500 may further include a protective layer. The protective layer may be configured to protect a semiconductor or a connecting part. The protective layer may be disposed on an inner circumferential surface and/or an outer circumferential surface of the thermoelectric elements 300 and 500. The protective layer may be formed of a metal or plastic. When the protective layer includes a metal, the protective layer may be configured to not conduct electricity with the terminals and the connecting parts.

Figure 8:
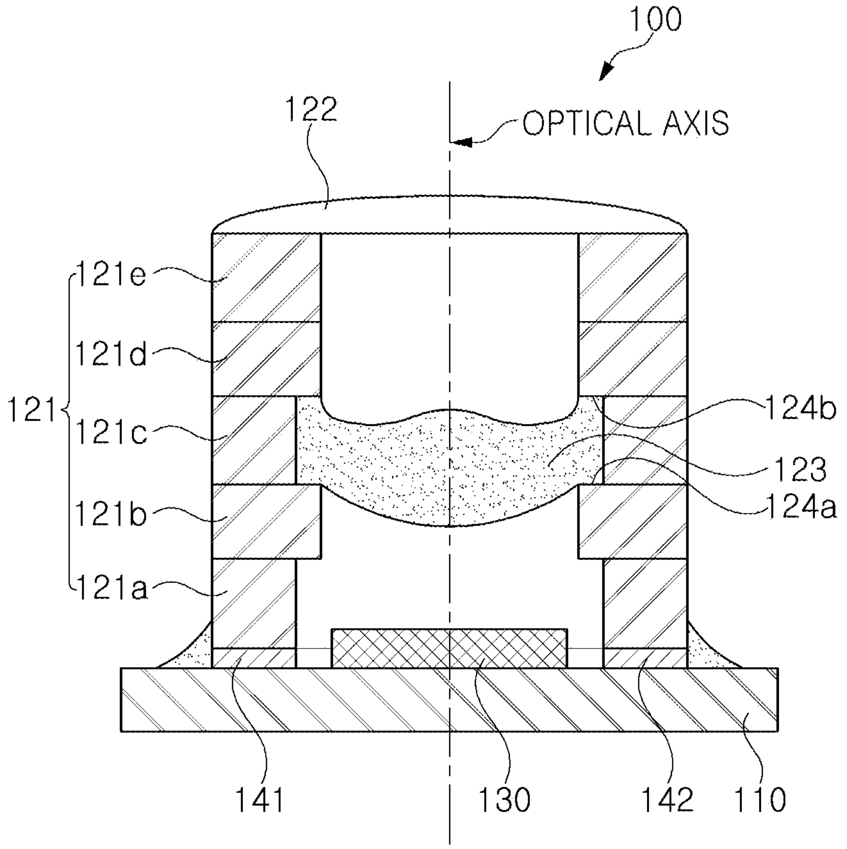
FIG. 8 is a diagram illustrating an example in which a plurality of thermoelectric elements forms a single thermoelectric element.

FIG. 8 is a diagram illustrating an example in which a plurality of thermoelectric elements form a single thermoelectric element.

In FIG. 8, the thermoelectric element 121 may include a plurality of unit thermoelectric elements. In the example, since the thermoelectric element 121 may work as a lens barrel, the thermoelectric element 121 may accommodate a plurality of lenses (e.g., the lens 123 in FIG. 3) arranged in the optical axis direction therein. In this case, the thermoelectric element 121 may need to have a height corresponding to the length of the plurality of lenses in the optical axis direction. However, since a thickness of a wafer, a raw material of a semiconductor, may generally be less than 1 mm, the thermoelectric element 121 illustrated in FIGS. 5 to 7 may generally have a relatively low height, 3 mm to 4 mm. Thus, the thermoelectric element 121 illustrated in FIGS. 5 to 7 may not be sufficient to accommodate a plurality of lenses.

In an example, by stacking the plurality of unit thermoelectric elements in the optical axis direction, the thermoelectric element 121 having a length in the optical axis direction and sufficient to accommodate the plurality of lenses may be implemented. The plurality of stacked unit thermoelectric elements may function as a single thermoelectric element 121.

In an example, the unit thermoelectric element may have the elements the same as or similar to those of the thermoelectric elements 300 and 500 illustrated in FIGS. 5 to 7. In an example, an insulating member may be disposed between the plurality of unit thermoelectric elements such that the terminals (or connecting parts) provided in the unit thermoelectric elements may not be electrically connected to the terminals (or connecting parts) of the neighboring thermoelectric elements.

In an example, the plurality of unit thermoelectric elements included in the thermoelectric element 121 may have different shapes. For example, the plurality of unit thermoelectric elements may have different heights and/or inner diameters.

In FIG. 8, five-unit thermoelectric elements 121*a*, 121*b*, 121*c*, 121*d*, and 121*e* may be stacked in the optical axis direction. The first unit thermoelectric element 121*a* may be disposed on the substrate 110, and the second unit thermoelectric element 121*b*, the third unit thermoelectric element 121*c*, the fourth unit thermoelectric element 121*d*, and the fifth unit thermoelectric element 121*e* may be stacked in order on the first unit thermoelectric element 121*a*.

In an example, each of the unit thermoelectric elements may include a penetrating portion therein. For example, each of the unit thermoelectric elements may have a ring shape, including a through-hole therein. In an example, when the unit thermoelectric elements are stacked side by side in a central axis direction, at least one lens may be accommodated in a space defined by the penetrating portions of the unit thermoelectric elements. When the thermoelectric element 121 is coupled to the substrate 110, at least one lens accommodated in the thermoelectric element 121 may be aligned with the image sensor 130.

In an example, the inner circumferential surface of the thermoelectric element 121 may include a stepped portion in the optical axis direction. In an example, a stepped portion in the optical axis direction may be present between at least two unit thermoelectric elements among the plurality of unit thermoelectric elements. The stepped portion may be implemented by stacking the unit thermoelectric elements having different inner circumferential diameters. In FIG. 8, the third unit thermoelectric element 121*c* may have an inner circumferential diameter larger than that of the second unit thermoelectric element 121*b*, and a stepped portion 124*a* may be formed between the unit thermoelectric elements. The fourth unit thermoelectric element 121*d* may have an inner circumferential diameter smaller than that of the third unit thermoelectric element 121*c*, and a stepped portion 124*b* may be formed between the thermoelectric elements.

In an example, at least one lens 123 may be partially supported by the stepped portions 124*a* and 124*b* of the thermoelectric element 121. For example, an outer circumferential diameter of at least one lens 123 may be greater than the inner circumferential diameter of the second unit thermoelectric element 121*b* and may be smaller than the inner circumferential diameter of the third unit thermoelectric element 121*c*. In this case, at least one lens 123 may be supported by the stepped portion 124*a* disposed between the second unit thermoelectric element 121*b* and the third unit thermoelectric element 121*c*.

In an example, a portion of at least one lens 123 may be disposed in the stepped portion of the thermoelectric element 121. For example, an edge of the lens 123 may be disposed on the stepped portion 124*a* disposed between the second unit thermoelectric element 121*b* and the third unit thermoelectric element 121*c*. In an example, a thickness of a portion (an outer portion) adjacent to the edge of the lens 123 may correspond to the height of the third unit thermoelectric element 121*c*. Accordingly, an upper end of the outer portion of the lens 123 may be seated on the stepped portion 124*b* disposed between the third unit thermoelectric element 121*c* and the fourth unit thermoelectric element 121*d*. A lower end may be seated on the stepped portion 124*a* disposed between the second unit thermoelectric element 121*b* and the third unit thermoelectric element 121*c*.

The illustrated example is merely an example, and various types of thermoelectric elements 121 may be implemented. For example, a thickness of an outer portion of the lens 123 may be smaller than the distance between the stepped portions 124*a* and 124*b*. As another example, a spacer configured to adjust the distance between two or more lenses and/or the lenses may be disposed between the stepped portions 124*a* and 124*b*. As another example, a unit thermoelectric element disposed more adjacent to the image sensor 130 may have a larger inner circumferential diameter. As another example, the thermoelectric element 121 may include less than or greater than five unit thermoelectric elements.

Figure 9:
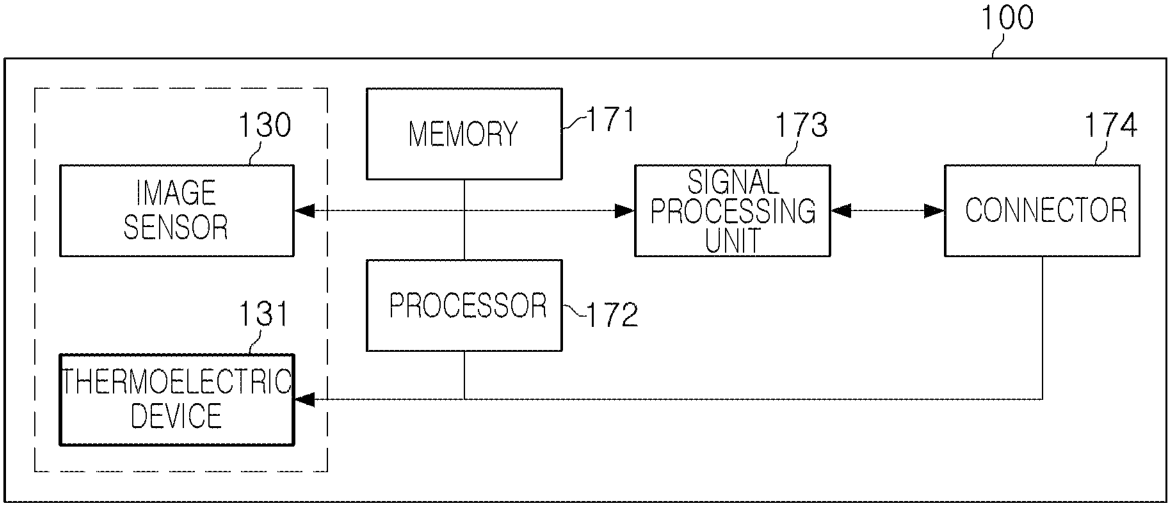
FIG. 9 is a diagram illustrating an example of a circuit configuration related to a thermoelectric element's operation.

FIG. 9 is a diagram illustrating an example of a circuit configuration related to operations of a thermoelectric element 121.

In an example, the camera module 100 may include an image sensor 130, a thermoelectric element 121, and a processor 172 (e.g., a microcontroller) for controlling a current supplied to the thermoelectric element 121.

In an example, the processor 172 may determine a voltage to be applied to the thermoelectric element 121 on the basis of a sensed external temperature or a sensed temperature of the camera module 100. In an example, a temperature sensor may be configured to measure a temperature of the image sensor 130 of the camera module 100 or a surrounding temperature of the image sensor 130. In an example, the temperature sensor may be configured as a component of the camera module 100 or a component of a device distinguished from the camera module 100.

In an example, the processor 172 may be configured to determine a direction or intensity of a current (or voltage) supplied to the thermoelectric element 121 on the basis of temperature information. For example, the processor 172 may determine a current (or voltage) control value corresponding to a specific temperature range, and may transfer the determined control value to an electrode (e.g., the electrodes 141 and 142 in FIG. 121), thereby operating thermoelectric element 121.

In an example, the processor 172 may determine whether the lens (or sensor unit) needs to be cooled or heated on the basis of the temperature information. For example, the processor 172 may determine whether the temperature measured by the temperature sensor exceeds a specified range. When the measured temperature exceeds a specified range, the processor 172 may apply a current to the thermoelectric element 121 to heat or cool a target object (e.g., the forwardmost lens 122 in FIG. 2). For example, the processor 172 may heat the lens by applying a current in the first direction to the thermoelectric element 121 when the temperature of the lens is lower than a predetermined threshold value. As another example, when the temperature of the image sensor 130 exceeds a specified threshold value, the processor 172 may apply a current to the thermoelectric element 121 to lower the temperature of the image sensor 130. In another example, when the temperature of the lens is higher than a threshold value, a current in the second direction may be applied to the thermoelectric element 121 to cool the lens.

In an example, power may be supplied to the thermoelectric element 121 directly from the connecting part 174 or may be supplied through the processor 172 of the camera module 100.

In an example, the camera module 100 may include a memory 171. The memory 171 may store basic information necessary for the operation of the camera, and the processor 172 may perform various operations necessary for the camera on the basis of the information obtained from the memory 171. For example, temperature threshold values may be stored in the memory 171 as a criterion for determining the direction or intensity of the current applied to the thermoelectric element 121.

In an example, the processor 172 or the temperature sensor may be provided as a component of the camera module 100. In another example embodiment, the processor 172 or the temperature sensor may be separately provided in an electronic device, including the camera module 100.

In an example, the camera module 100 may include a signal processing unit 173 (e.g., a serializer) configured to process an image signal generated by the image sensor 130. The image signal may be transferred to an external entity through the connecting part 174.

According to the aforementioned examples, condensation or frost formed on the camera lens may be prevented, and condensation or frost may be effectively removed when formed. Also, according to the examples, deterioration of performance of the camera caused by overheating of the image sensor may be prevented or reduced. Further, thermal deformation of the camera lens may be prevented or reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:

a substrate including an image sensor disposed on a first surface of the substrate;

a thermoelectric element disposed on the first surface of the substrate;

an electrode disposed on the first surface of the substrate between the first surface of the substrate and a first surface of the thermoelectric element; and a first lens disposed foremost from an object side and farthest from the substrate, among a plurality of lenses, and directly contact a second surface of the thermoelectric element by being disposed on the second surface of the thermoelectric element, wherein the electrode is disposed on the first surface of the substrate to surround the image sensor at a position spaced apart from the image sensor, and wherein the first and second surfaces are on opposing ends of the thermoelectric element along an optical center of the first lens.

2. The camera module of claim 1, wherein the thermoelectric element is configured to cool the image sensor and heat the first lens when a voltage of a first polarity is applied to the thermoelectric element through the electrode.

3. The camera module of claim 2, wherein the thermoelectric element is configured to cool the first lens when a voltage of a second polarity, different from the first polarity, is applied to the thermoelectric element through the electrode.

4. The camera module of claim 1, further comprising:

a second lens, wherein the thermoelectric element includes a penetrating portion configured to accommodate the second lens.

5. The camera module of claim 4, wherein the second lens includes a plurality of second lenses.

6. The camera module of claim 1, wherein the substrate includes a heat transfer member disposed below the image sensor.

7. The camera module of claim 1, wherein the thermoelectric element includes a plurality of unit thermoelectric elements stacked in an optical axis direction.

8. The camera module of claim 7, further comprising:

at least one second lens, wherein the thermoelectric element includes a penetrating portion configured to accommodate the at least one second lens.

9. The camera module of claim 8, wherein each of the unit thermoelectric elements includes a penetrating portion, and the at least one second lens is accommodated in at least one of the penetrating portions of the plurality of unit thermoelectric elements.

10. The camera module of claim 9, wherein at least one stepped portion is formed between the plurality of unit thermoelectric elements, and the at least one second lens is partially supported by the stepped portion.

11. The camera module of claim 1, wherein the electrode has a positive electrode and a negative electrode, and the positive electrode and the negative electrode are electrically connected to corresponding terminals provided in the thermoelectric element.

12. The camera module of claim 11, wherein the positive electrode and the negative electrode have an arc shape centered on the image sensor.

13. The camera module of claim 1, wherein the thermoelectric element has a cylindrical shape configured to accommodate the image sensor, one end of the thermoelectric element in a length direction is in contact with the electrode, and another end of the thermoelectric element in the length direction is in contact with the lens.

14. The camera module of claim 13, wherein the thermoelectric element includes at least one P-type semiconductor and at least one N-type semiconductor alternately circumferentially disposed.

15. A camera module, comprising:

a substrate including an electrode and an image sensor both disposed on a first surface of the substrate;

a thermoelectric element having a first end electrically connected to the electrode such that the electrode is disposed between the first surface of the substrate and the first end of the thermoelectric element; and a lens disposed foremost from an object side and a farthest from the substrate, among a plurality of lenses, and directly in contact with a second end of the thermoelectric element, wherein the electrode is disposed on the first surface of the substrate to surround the image sensor at a position spaced apart from the image sensor, and wherein the first end or the second end of the thermoelectric element is configured to absorb or release heat based on a voltage applied through the electrode, and the first and second ends of the thermoelectric element are spaced apart and oppose each other along an optical center of the first lens.

16. The camera module of claim 15, wherein the thermoelectric element is electrically connected to the substrate, and wherein the thermoelectric element is further configured to cool the image sensor and to heat the lens when a voltage of a first polarity is applied to the thermoelectric element.

17. The camera module of claim 16, wherein the thermoelectric element is further configured to cool the lens when a voltage of a second polarity, different from the first polarity, is applied to the thermoelectric element.

18. The camera module of claim 17, further comprising a second lens being accommodated in the thermoelectric element.

19. The camera module of claim 18, wherein the second lens includes a plurality of second lenses.

* * * * *